United States Patent
Gumpoltsberger

(10) Patent No.: US 7,566,283 B2
(45) Date of Patent: Jul. 28, 2009

(54) MULTI-SPEED TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 345 days.

(21) Appl. No.: 11/704,878

(22) Filed: Feb. 9, 2007

(65) Prior Publication Data
US 2007/0213168 A1    Sep. 13, 2007

(30) Foreign Application Priority Data
Feb. 14, 2006   (DE) .................. 10 2006 006 636

(51) Int. Cl.
*F16H 3/62* (2006.01)
(52) U.S. Cl. ...................................... 475/275
(58) Field of Classification Search .................. 475/275
See application file for complete search history.

(56) References Cited

U.S. PATENT DOCUMENTS

| | | | |
|---|---|---|---|
| 4,395,925 A | | 8/1983 | Gaus |
| 5,106,352 A | | 4/1992 | Lepelletier |
| 6,139,463 A | | 10/2000 | Kasuya et al. |
| 6,176,803 B1 * | | 1/2001 | Meyer et al. ................. 475/286 |
| 6,558,287 B2 | | 5/2003 | Hayabuchi et al. |
| 6,572,507 B1 | | 6/2003 | Korkmaz et al. |
| 6,634,980 B1 | | 10/2003 | Ziemer |
| 6,860,831 B2 | | 3/2005 | Ziemer |
| 7,018,319 B2 | | 3/2006 | Ziemer |
| 7,458,912 B2 * | | 12/2008 | Oguri et al. ................. 475/275 |

FOREIGN PATENT DOCUMENTS

| | | |
|---|---|---|
| DE | 29 36 969 | 4/1981 |
| DE | 199 12 480 | 9/2000 |
| DE | 199 49 507 | 4/2001 |
| DE | 101 15 983 | 10/2002 |
| DE | 101 15 987 | 10/2002 |
| DE | 102 13 820 | 10/2002 |
| EP | 0 434 525 | 6/1991 |
| JP | 2006307954 A * | 11/2006 |
| JP | 2006349153 A * | 12/2006 |

* cited by examiner

*Primary Examiner*—Ha D. Ho
(74) *Attorney, Agent, or Firm*—Davis & Bujold, P.L.L.C.

(57) ABSTRACT

An input shaft is connected to a carrier of first set (P1) and a sun gear of second set (P2) and is connectable to a fifth shaft, which couples a carrier of third set (P3) and is connectable to the housing. The sun gear of the first set (P1) is coupled the housing. The fourth shaft couples the ring gear of third set (P3) and the sun gear of fourth set (P4) and is connectable to the housing. The third shaft couples the ring gear of second set (P2) and the carrier of fourth set (P4). The sixth shaft couples the ring gear of first set (P1) and the sun gear of the third set (P3). The seventh shaft couples the carrier of the second set (P2). The output shaft couples the ring gear of forth set (P4). A clutch releasably connects the output shaft to the seventh shaft.

21 Claims, 4 Drawing Sheets

| | 1 | 2 | 3 | 4 | 5 | 6 | 7 | 8 | 9 | R1 |
|---|---|---|---|---|---|---|---|---|---|---|
| i_G | 4.40 | 2.76 | 2.06 | 1.45 | 1.06 | 0.82 | 0.65 | 0.55 | 0.49 | -3.55 |
| phi | 8.99 | 1.60 | 1.34 | 1.42 | 1.37 | 1.30 | 1.25 | 1.18 | 1.13 | -0.81 |
| 03 | X | X | | | | | | | | X |
| 04 | | | | X | | | | X | | |
| 05 | X | | X | | | | | | X | |
| 15 | | | | | X | | X | | | X |
| 27 | | X | X | X | X | X | | | | |
| 36 | | | | | | X | X | X | X | |

| | 1 | 2 | 3 | 4 | 5 | 6 | 7 | 8 | 9 | R1 |
|---|---|---|---|---|---|---|---|---|---|---|
| i_G | 4.08 | 2.75 | 2.12 | 1.43 | 1.06 | 0.77 | 0.59 | 0.51 | 0.45 | -3.69 |
| phi | 9.04 | 1.48 | 1.30 | 1.48 | 1.36 | 1.38 | 1.30 | 1.16 | 1.12 | -0.91 |
| 03 | X | X | | | | | | | | X |
| 04 | | | | X | | | | X | | |
| 05 | X | | X | | | | | | X | |
| 15 | | | | | X | | X | | | X |
| 27 | | X | X | X | X | X | | | | |
| 67 | | | | | | X | X | X | X | |

MULTI-SPEED TRANSMISSION

This application claims priority from German Application Ser. No. DE 10 2006 006 636.7 filed Feb. 14, 2006.

FIELD OF THE INVENTION

The invention concerns a multi-speed transmission of planetary construction, in particular an automatic transmission for a motor vehicle.

BACKGROUND OF THE INVENTION

According to the prior art, automatic transmissions, in particular for motor vehicles, comprise planetary gearsets, which are shifted by way of friction or shifting elements, such as possibly clutches and brakes, and are usually connected to a starting element that is subjected to a slip effect and is selectively provided with a lockup clutch, such as a hydrodynamic torque converter or a fluid clutch.

A transmission such as this is disclosed in EP 0 434 525 A1. It comprises essentially an input shaft and an output shaft, which are arranged parallel to each other, a double planetary gearset arranged concentrically with the output shaft, and five shifting elements in the form of three clutches and two brakes, whose selective lockup, in pairs, determines the various gear ratios between the input shaft and the output shaft. The transmission comprises a front-mounted gearset and two power paths, so that six forward gears can be achieved by selectively engaging the five shifting elements, in pairs.

In the first power path, two clutches are required for the transmission of torque from the front-mounted gearset to two elements of the double planetary gearset. These are arranged in the direction of power flow essentially behind the front-mounted gearset in the direction of the double planetary gearset. Another clutch is provided in the second power path, which detachably connects this to another element of the double planetary gearset. The clutches are arranged in such a way herein that the inner disk carrier forms the output.

A compact multi-speed transmission of planetary construction, in particular for a motor vehicle, which comprises two planetary gearsets and one front-mounted gearset, as well as three, clutches and two brakes, is also known from U.S. Pat. No. 6,139,463. In this known multi-speed transmission, two clutches C-1 and C-3 are provided in a first power path for transmitting torque from the front-mounted gearset to the two planetary gearsets. Here, the outer disk carrier and/or the cylinder or piston and pressure compensating side of the clutch C-3 is connected to a first brake B-1. The inner disk carrier of the third clutch C-3 is additionally connected to the cylinder or piston and pressure compensating side of the first clutch C-1, wherein the inner disk carrier of the first clutch C-1 is arranged on the output side and is connected to a sun gear of the third planetary gearset.

From DE 199 49 507 A1 of the applicant a multi-speed transmission is additionally known, in which two non-shiftable front-mounted gearsets are provided on the input shaft, which generate two rotational speeds on the output side, which, in addition to the rotational speed of the input shaft, can be optionally shifted to a shiftable double planetary gearset that acts on the output shaft by selectively engaging the shifting elements that are used in such a way that in order to shift from one gear to the next higher or lower gear, only one shifting element of the two just actuated shifting elements has to be engaged or disengaged.

From DE 199 12 480 A1 an automatically shiftable motor vehicle transmission is known, which comprises three carrier-mounted planetary gearsets as well as three brakes and two clutches for shifting six forward gears and one reverse gear, and one input shaft and one output shaft. The automatically shiftable motor vehicle transmission is configured in such a way that the input shaft is connected directly to the sun gear of the second planetary set, and the input shaft can be connected to the sun gear of the first planetary set by way of the first clutch and/or to the carrier of the first planetary set by way of the second clutch. In addition or as an alternative, the sun gear of the first planetary set can be connected to the housing of the transmission by way of the first brake and/or the carrier of the first planetary set can be connected to the housing by way of the second brake and/or the sun gear of the third planetary set can be connected to the housing by way of the third brake.

From DE 102 13 820A1 an automatic multi-speed transmission is further known, which comprises a first input path T1 of a first gear ratio; an input path T2, which has a greater gear ratio than this input path T1; a planetary gearset with four elements, wherein the four elements are arranged in a direction of power flow in the order of a first element, a second element, a third element, and a fourth element; a clutch C-2, which transmits rotation of the input path T2 to the first element S3; a clutch C-1, which transmits rotation from the input path T2 to the fourth element S2; a clutch C-4, which transmits rotation from the input path T1 to the first element; a clutch C-3, which transmits rotation from the input path T1 to the second element C3; a brake B-1, which that engages the fourth element; a brake B-2, which that engages the second element; and an output element, which is coupled to the third element R3.

Within the scope of DE 101 15 983 A1 of the applicant a multi-speed transmission is described, which comprises an input shaft that is connected to a front-mounted set, an output shaft that is connected to a rear-mounted set, and a maximum of seven shifting elements, whose selective shifting allows at least seven forward gears to be shifted into without a range shift. The front-mounted set is comprised of a front-mounted planetary gearset or a maximum of two non-shiftable front-mounted planetary gearsets that are coupled to the first front-mounted planetary gearset, wherein the rear-mounted set is configured as a two-carrier, four-shaft transmission with two shiftable, rear-mounted planetary gearsets, and has four free shafts. The first free shaft of this two-carrier, four-shaft transmission is connected to the first shifting element; the second free shaft is connected to the second and third shifting elements; the third free shaft is connected to the fourth and fifth shifting elements; and the fourth free shaft is connected to the output shaft. For a multi-speed transmission with a total of six shifting elements, it is proposed according to the invention to additionally connect the third free shaft or the first free shaft of the rear-mounted set to a sixth shifting element. For a multi-speed transmission with a total of seven shifting elements, it is proposed according to the invention to additionally connect the third free shaft to a sixth shifting element D' and to additionally connect the first free shaft to a seventh shifting element.

A multi-speed transmission with at least seven gears is further described within the scope of DE 101 15 987 A1 of the applicant. This transmission consists, in addition to the input shaft and the output shaft, of a non-shiftable front-mounted gearset and a shiftable rear-mounted gearset in the form of a two-carrier, four-shaft transmission. The front-mounted gearset consists of a first planetary gearset, which offers, in addition to the input rotational speed of the input shaft, a second rotational speed, which can be optionally applied on a rear-mounted gearset. The rear-mounted gearset consists of two shiftable planetary gearsets, which can shift into at least seven gears using the six shifting elements, whereupon two power paths are formed. Range shifts are advantageously always prevented during each shifting operation. A 9-gear multi-speed transmission is further known from DE 29 36 969 A1; it comprises eight shifting elements and four gearsets, wherein one gearset serves as the front-mounted transmission and the main transmission has a Simpson set and another gearset serving as a reversing transmission.

Automatically shiftable motor vehicle transmissions of planetary construction have been described multiple times in the prior art and are subject to continuous development and improvement. These transmissions should have a sufficient number of forward gears as well as one reverse gear and a gear ratio that is well suited for motor vehicles, with a high overall transmission ratio spread as well as favorable progressive ratios. They should further enable a high starting ratio in the forward direction and contain a direct gear, and should be suitable for use in both passenger vehicles and commercial vehicles. In addition, these transmissions should require a low construction resource expenditure, in particular a small number of shifting elements, and should prevent double-shifting during sequential shifting, so that only one shifting element is changed when shifting into defined gear groups.

It is the object of the invention to propose a multi-speed transmission of the kind described above, in which the construction resource expenditure is reduced and the efficiency in the main travel gears is improved, in addition, in terms of drag and gearing losses. A low torque should act on the shifting elements and planetary sets and the rotation speeds of the shafts, shifting elements, and planetary sets should also be kept as low as possible with the multi-speed transmission of the invention. The number of gears as well as the spread of transmission ratios should also be increased, so that at least nine forward gears and at least one reverse gear can be advantageously realized. The transmission of the invention should furthermore be suited to any vehicle design, especially for a front-transverse arrangement. It is another object of the invention to disclose a multi-speed transmission that has a particularly compact design.

SUMMARY OF THE INVENTION

A multi-speed transmission of planetary construction is consequently proposed, which comprises an input shaft and an output shaft, which are arranged in a housing. At least four planetary sets, which in the following will be called the first, second, third and fourth planetary sets, at least seven rotatable shafts, which in the following will be called the input shaft, the output shaft, the third, fourth, fifth, sixth and seventh shafts, as well as at least six shifting elements, comprising brakes and clutches, are provided, whose selective engagement induces different gear ratios between the input shaft and the output shaft, so that preferably nine forward gears and one reverse gear can be implemented.

According to the invention, the input shaft is permanently connected to the carrier of the first planetary set and the sun gear of the second planetary set, and can be releasably connected by way of a clutch to the fifth shaft, which is permanently connected to the carrier of the third planetary set, and can be coupled to the housing by way of a brake, while the sun gear of the first planetary set is connected in a slip-free manner to the housing.

According to the invention, the fourth shaft is permanently connected to the ring gear of the third planetary set and to the sun gear of the fourth planetary set, and can be coupled to the housing by way of a brake; wherein the third shaft is permanently connected to the ring gear of the second planetary set and to the carrier of the fourth planetary set, and can coupled to the housing by way of a brake; and wherein the sixth shaft is permanently connected to the ring gear of the first planetary set and to the sun gear of the third planetary set; the seventh shaft is permanently connected to the carrier of the second planetary set; wherein the output shaft is permanently connected to the ring gear of the fourth planetary set, and can be releasably connected to the seventh shaft by way of a clutch. Furthermore, either the third and the sixth shaft can be mutually releasably connected by way of a clutch, or the sixth and the seventh shaft can be mutually releasably connected by way of a clutch.

The configuration of the multi-speed transmission, according to the invention, induces suitable gear ratios, particularly for passenger vehicles, as well as a significant increase in the overall transmission ratio spread of the multi-speed transmission, whereby an improvement in driving comfort and a significant decrease in fuel consumption are brought about.

The construction resource expenditure is furthermore considerably reduced with the multi-speed transmission according to the invention due to a low number of shifting elements, preferably three brakes and three clutches. It is advantageously possible with the multi-speed transmission according to the invention to start driving with a hydrodynamic converter, an external starting clutch, or also with other suitable external starting elements. It is also conceivable to enable a starting procedure with a starting element that is integrated into the transmission. A shifting element, which is actuated in the first forward gear and in the reverse gear, is preferably suitable.

Beyond that, the multi-speed transmission according to the invention achieves a good efficiency in the main travel gears with regard to drag and gearing losses.

A low torque is furthermore present in the shifting elements and in the planetary sets of the multi-speed transmission, thereby reducing wear in the multi-speed transmission. The low torque enables a correspondingly small dimensioning, whereby the required installation space and corresponding costs are reduced. In addition, low rotational speeds are also present at the shafts, the shifting elements, and the planetary sets.

Moreover, the transmission according to the invention is designed in such a way that adaptation to different drive train configurations, both in the power flow direction and from a spatial point of view, is possible; consequently, it is possible, for example, to provide the input and output on the same side of the housing.

BRIEF DESCRIPTION OF THE DRAWINGS

The invention will now be described, by way of example, with reference to the accompanying drawings in which.

DETAILED DESCRIPTION OF THE INVENTION

Figures 1, 2:
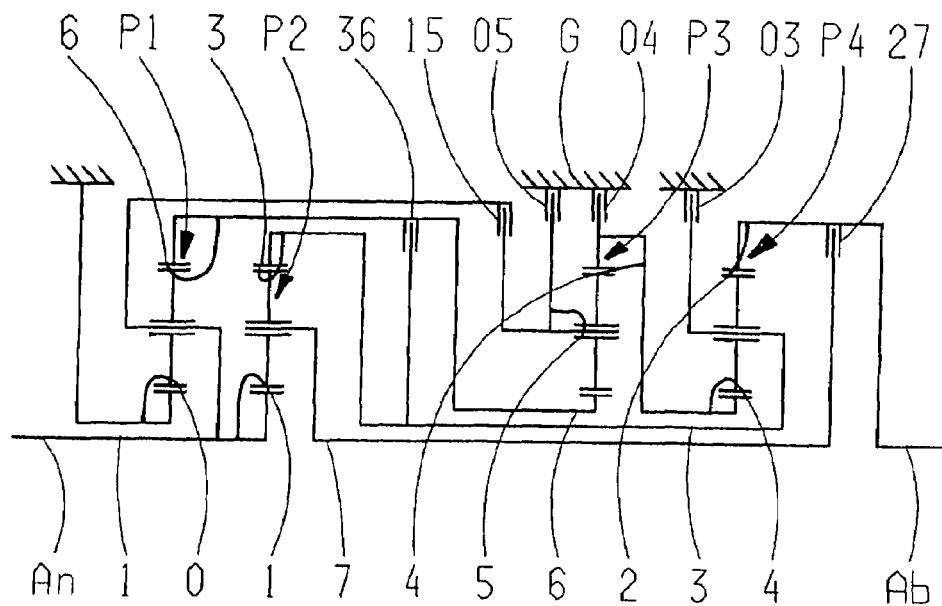
FIG. 1 shows a schematic view of a preferred embodiment of a multi-speed transmission according to the invention.
FIG. 2 shows an exemplary shifting diagram of a multi-speed transmission according to FIG. 1.

In FIG. 1, according to the invention, a multi-speed transmission is depicted comprising an input shaft 1 and an output shaft 2, which are arranged in a housing G. Four planetary sets P1, P2, P3 and P4 are provided, which are configured as negative planetary sets and are preferably arranged in the sequence P1,P2,P3,P4, one after the other in an axial direction or in the direction of power flow.

As is shown in FIG. 1, six shifting elements, namely three brakes 03, 04, 05 and three clutches 15, 27 and 36, are provided. The clutches are preferably configured as disk clutches.

Selectively shifting these shifting elements produces nine forward gears and one reverse gear. The multi-speed transmission according to the invention has a total of seven rotatable shafts, namely the shafts 1, 2, 3, 4, 5, 6 and 7.

In the multi-speed transmission of FIG. 1, it is provided according to the invention that the input is introduced by way of the shaft 1, which is permanently connected to the carrier of the first planetary set P1 and to the sun gear of the second planetary set P2, and can be releasably connected by way of the clutch 15 to the shaft 5, which is permanently connected to the carrier of the third planetary set P3, and can be coupled to the housing by way of the brake 05, wherein the sun gear of the first planetary set P1 is connected in a torque-proof manner to the housing (shaft 0).

According to the invention, the shaft 4 is permanently connected to the ring gear of the third planetary set P3 and to the sun gear of the fourth planetary set P4, and can be coupled to the housing G by way of the brake 04. The shaft 3 is furthermore permanently connected to the ring gear of the second planetary set P2 and to the carrier of the fourth planetary set P4, and can be coupled to the housing G by way of the brake 03; wherein the shaft 6 is permanently connected to the ring gear of the first planetary set P1 and to the sun gear of the third planetary set P3, and the shaft 7 is permanently connected to the carrier of the second planetary set P2. The output is carried out by way of the shaft 2, which is permanently connected to the ring gear of the fourth planetary set P4, wherein the clutch 27 releasably connects the output shaft 2 to the shaft 7 and the clutch 36 mutually releasably connects the shafts 3 and 6.

The spatial arrangement of the shifting elements is optional and is limited only by the dimensions and the outer shape.

In FIG. 2 an exemplary shifting diagram of a multi-speed transmission, according to FIG. 1, is depicted. Two shifting elements are engaged for each gear.

The shifting diagram shows as an example the respective gear ratios i of the individual gear ratios and the progression ratios phi to be determined therefrom. FIG. 2 shows that double shifting or range shifts are prevented in the sequential shifting operation, since two adjoining gear steps jointly utilize one shifting element.

The first gear is achieved by engaging the brakes 03 and 05; the second gear is achieved by engaging the brake 03 and the clutch 27; the third gear is achieved by engaging the clutch 27 and the brake 05; and the fourth gear is achieved by engaging the clutch 27 and the brake 04. Moreover, the fifth gear is achieved by engaging the clutches 15 and 27; the sixth gear is achieved by engaging the clutch 27 and the clutch 36; the seventh gear is achieved by engaging the clutch 15 and the clutch 36; the eighth gear is achieved by engaging the brake 04 and the clutch 36, and the ninth gear is achieved by engaging the brake 05 and the clutch 36. As can be seen in the shifting diagram, the reverse gear is achieved by engaging the brake 03 and the clutch 15.

Figures 3, 4:
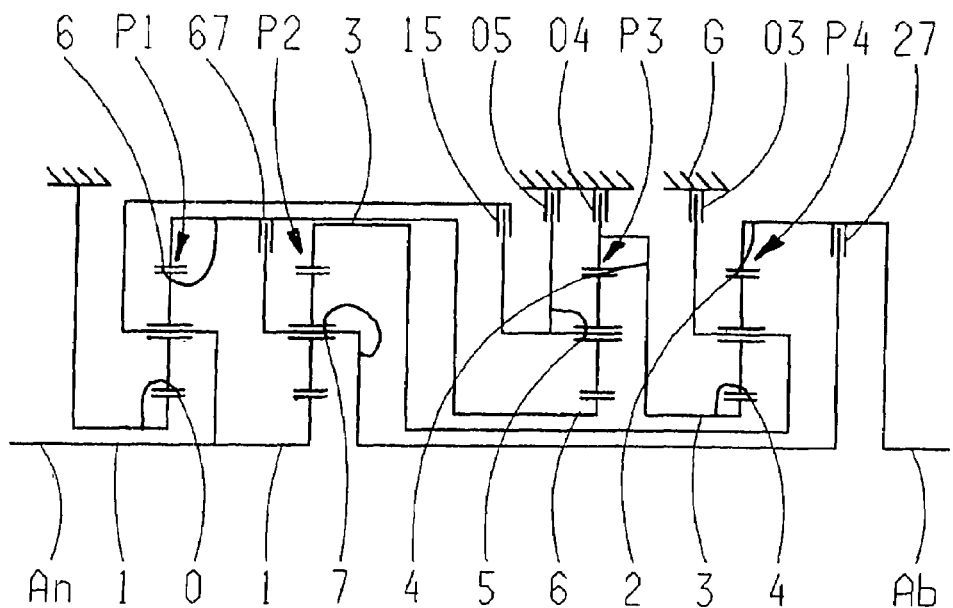
FIG. 3 shows a schematic view of another preferred embodiment of a multi-speed transmission according to the invention.
FIG. 4 shows an exemplary shifting diagram of a multi-speed transmission according to FIG. 3.

The exemplary embodiment shown in FIG. 3 differs from the multi-speed transmission according to FIG. 1, in that the shafts 6 and 7 can be mutually releasably connected by way of a clutch 67, while the releasable connection between the input shafts 3 and 6 is omitted. The corresponding schematic diagram is shown in FIG. 4 and corresponds to the schematic diagram, according to FIG. 2, with the difference that the clutch 36 is replaced by the clutch 67.

A startup is possible according to the invention, with an integrated shifting element IAK. A shifting element, which is required in the first gear and in the reverse gear without reversal of the direction of rotation, for example, the brake 03, is particularly suitable for this.

Different gear progressions can also be achieved according to the invention with the same transmission diagram, depending on the shifting logic, so that a variation that is specifically adapted to the application and/or vehicle is made possible.

Figure 10:
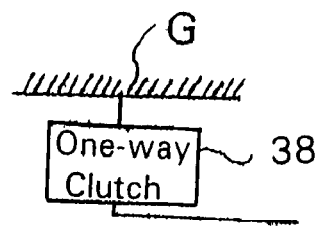
FIG. 10 is a diagrammatic view of an embodiment of the inventive multi-speed transmission having a one-way clutch.

It is also possible, as shown in FIG. 10, to provide additional one-way clutches 38 at each suitable point on the multi-speed transmission, for example between a shaft and the housing or in order to connect two shafts, if required.

Figure 5:
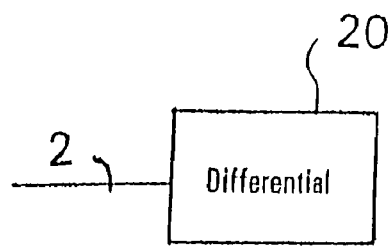
FIG. 5 is a diagrammatic view of an embodiment of the inventive multi-speed transmission having a differential.

An axle differential 20 and/or a distributor differential can be arranged at the input side or at the output side, according to the invention, as shown in FIG. 5.

Figure 6:
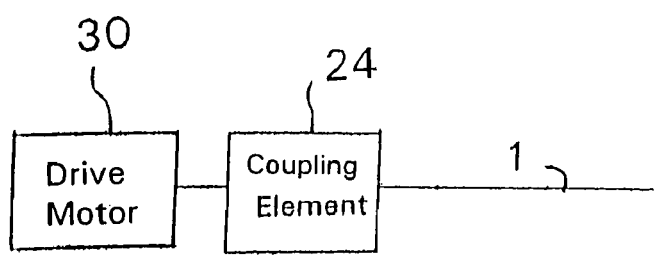
FIG. 6 is a diagrammatic view of an embodiment of the inventive multi-speed transmission with a coupling element and a drive motor.
Figure 7:
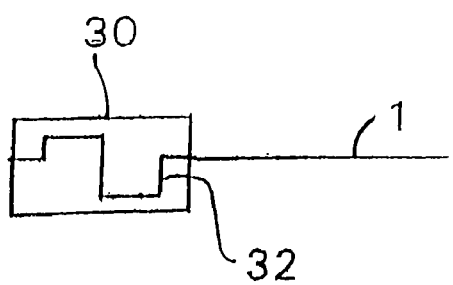
FIG. 7 is a diagrammatic view of an embodiment of the inventive multi-speed transmission with a crankshaft of the drive motor fixed to an input shaft of the multi-speed transmission.
Figure 14:
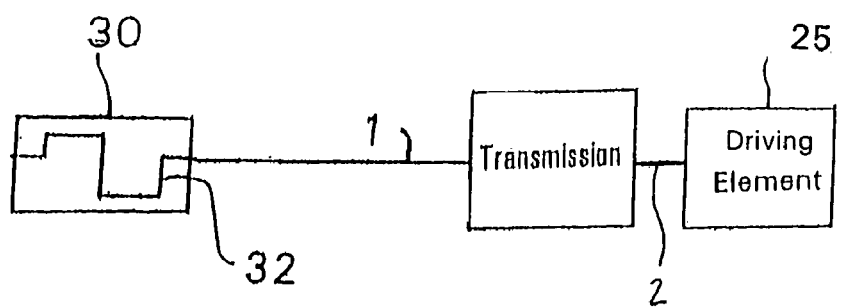
FIG. 14 is a diagrammatic view of another embodiment of the inventive multi-speed transmission with the crankshaft of the drive motor fixed to the input shaft of the multi-speed transmission and the coupling element located behind the multi-speed transmission.

Within the scope of an advantageous further development, as shown in FIG. 6, the input shaft 1 can be separated, if required, from a driving motor 30 by way of a coupling element 24, while a hydrodynamic converter, a hydraulic clutch, a dry starting clutch, a wet starting clutch, a magnetic powder clutch or a centrifugal clutch can be used as the clutch element. As shown in FIG. 14, it is also feasible to arrange a driving element 25 in the power flow direction behind the transmission in which case the input shaft 1 is permanently connected to the crankshaft 32 of the drive motor 30 and shown in FIG. 7.

Figure 8:
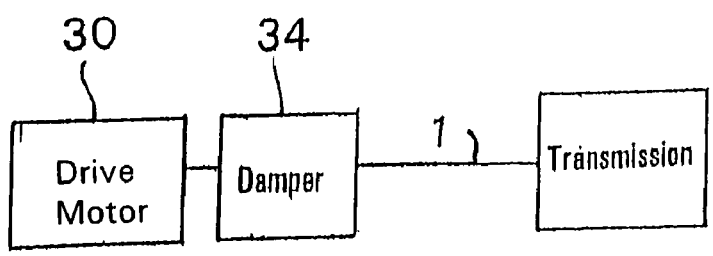
FIG. 8 is a diagrammatic view of an embodiment of the inventive multi-speed transmission having the drive motor communicating with a damper.

The multi-speed transmission, according to the invention and shown in FIG. 8, also permit a torsional vibration damper 34 to be provided between the drive motor 30 and the transmission.

Figure 9:
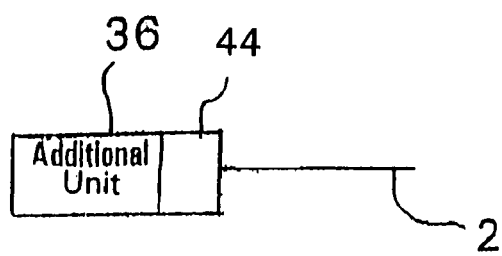
FIG. 9 is a diagrammatic view of an embodiment of the inventive multi-speed transmission with a power take-off for driving an additional unit.
Figure 12:
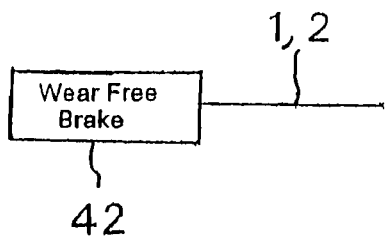
FIG. 12 is a diagrammatic view of a preferred design of the inventive multi-speed transmission having a wear free brake.
Figure 13:
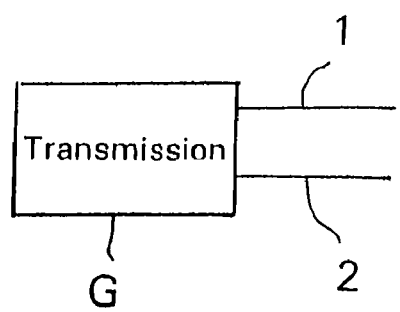
FIG. 13 is a diagrammatic view of a further embodiment of the invention with the input and the output being provided on the same side of the multi-speed transmission housing.

Within the scope of a further embodiment, as shown in FIG. 12, of the invention, a wear-free brake 42, for example a hydraulic or electric retarder or the like, can be arranged on each shaft, preferably on the input shaft 1 or the output shaft 2, which is of particular importance for use in commercial vehicles. An power take-off 44 can additionally be provided, as shown in FIG. 9, on each shaft, preferably on the input shaft 1 or the output shaft 2, in order to drive additional units 36. Additionally, as shown in FIG. 13, the input and the output are provided on the same side of the housing G.

The shifting elements that are used can be configured as power shifting clutches or power shifting brakes. Friction-locking clutches or friction-locking brakes, such as disk clutches, band brakes and/or cone clutches, can be used. Moreover, positive brakes and/or positive clutches, such as synchronizing mechanisms or claw clutches, can also be used as shifting elements.

Figure 11:
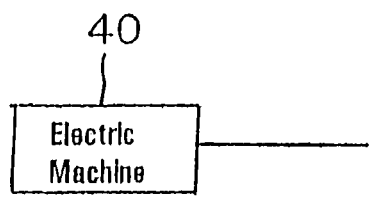
FIG. 11 is a diagrammatic view of an embodiment of the inventive multi-speed transmission with an electric machine.

Another advantage of the multi-speed transmission presented here, in FIG. 11, is that an electric machine 40 can be mounted as a generator and/or as an additional drive unit on each shaft.

Any embodiment configuration, in particular any spatial arrangement of the planetary sets and the shifting elements per se as well as with respect to each other, is understood to be covered under the protective scope of the claims, as long as it is practical from a technical point of view and does not influence the function of the transmission as disclosed in the claims, even if these embodiments are not explicitly depicted in the Figures or described in the disclosure.

REFERENCE NUMERALS 1 shaft
2 shaft
3 shaft
4 shaft
5 shaft
6 shaft
7 shaft
03 brake
04 brake
05 brake
15 clutch
27 clutch
36 clutch
67 clutch
P1 planetary gearset
P2 planetary gearset
P3 planetary gearset
P4 planetary gearset
i gear ratio
phi progression ratio
G housing
IAK integrated shifting element

The invention claimed is:

1. A multi-speed transmission of a planetary construction for an automatic transmission of a motor vehicle, the transmission comprising:
    an input shaft (1) and an output shaft (2) arranged in a housing (G);
    first, second, third and fourth planetary gear sets (P1, P2, P3, P4), and each of the first, the second, the third and the fourth planetary gear sets (P1, P2, P3, P4) comprising a sun gear, a carrier and a ring gear;
    at least third, fourth, fifth, sixth and seventh rotatable shafts (3, 4, 5, 6, 7) as well as at least six shifting elements (03, 04, 05, 15, 27, 36, 67), comprising first, second, and third brakes (03, 04, 05) and first, second, and third clutches (15, 27, 36, 67), whose selective engagement achieves different gear ratios between the input shaft (1) and the output shaft (2) so that at least first, second, third, fourth, fifth, sixth, seventh, eighth and ninth forward gears and one reverse gear can be implemented by the transmission;
    wherein the input shaft (1) is permanently connected to the carrier of the first planetary set (P1) and the sun gear of the second planetary set (P2), and detachably connected, via the first clutch (15), to the fifth shaft (5);
    the output shaft (2) is permanently connected to the ring gear of the fourth planetary set (P4) and detachably connected, via the second clutch (27), to the seventh shaft (7);
    the third shaft (3) is permanently connected to the ring gear of the second planetary set (P2) and the carrier of the fourth planetary set (P4) and detachably connected, via the first brake (03), to the housing (G);
    the fourth shaft (4) is permanently connected to the ring gear of the third planetary set (P3) and the sun gear of the fourth planetary set (P4), and detachably connected, via the second brake (04), to the housing (G);
    the fifth shaft (5) is permanently connected to the carrier of the third planetary set (P3) and detachably connected, via the third brake (05), to the housing (G);
    the sixth shaft (6) is permanently connected to the ring gear of the first planetary set (P1) and the sun gear of the third planetary set (P3);
    the seventh shaft (7) is permanently connected to the carrier of the second planetary set (P2);
    one of:
        the third shaft (3) is detachably connected, via the third clutch (36), to the six shaft (6); and
        the sixth shaft (6) is detachably connected, via the fourth clutch (67), to the seventh shaft (7); and
    the sun gear of the first planetary set (P1) is fixed to the housing (G).

2. The multi-speed transmission of claim 1, wherein the first planetary gear set (P1), the second planetary gear set (P2), the third planetary gear set (P3) and the fourth planetary gear set (P4) are arranged in an axial direction in the following sequential order:
    the first planetary gear set (P1), the second planetary gear set (P2), the third planetary gear set (P3) and the fourth planetary gear set (P4).

3. The multi-speed transmission of claim 1, wherein the first planetary gear set (P1), the second planetary gear set (P2), the third planetary gear set (P3) and the fourth planetary gear set (P4) are all negative planetary sets.

4. The multi-speed transmission of claim 1, wherein the at least first, second, third, fourth, fifth, sixth, seventh, eighth and ninth forward gears result from one of the arrangements:
    if the third shaft (3) is detachably connected, via the third clutch (36), to the six shaft(6) then, the first forward gear results from engagement of the first brake (03) and the third brake (05), the second forward gear results from engagement of the first brake (03) and the second clutch (27), the third forward gear results from engagement of the second clutch (27) and the third brake (05), the fourth forward gear results from engagement of the second clutch (27) and the second brake (04), the fifth forward gear results from engagement of the first clutch (15) and the second clutch (27), the sixth forward gear results from engagement of the second clutch (27) and the third clutch (36), the seventh forward gear results from engagement of the first clutch (15) and the third clutch (36), the eighth forward gear results from engagement of the second brake (04) and the third clutch (36), and the ninth forward gear results from engagement of the third brake (05) and the third clutch (36); and if the sixth shaft (6) is detachably connected, via the third clutch (67), to the seventh shaft (7) then, the first forward gear results from engagement of the first brake (03) and the third brake (05), the second forward gear results from engagement of the first brake (03) and the second clutch (27), the third forward gear results from engagement of the second clutch (27) and the third brake (05), the fourth forward gear results from engagement of the second clutch (27) and the second brake (04), the fifth forward gear results from engagement of the first clutch (15) and the second clutch (27), the sixth forward gear results from engagement of the second clutch (27) and the third clutch (67), the seventh forward gear results from engagement of the first clutch (15) and the third clutch (67), the eighth forward gear results from engagement of the second brake (04) and the third clutch (67), and the ninth forward gear results from engagement of the third brake (05) and the third clutch (67).

5. The multi-speed transmission of claim 1, wherein the reverse gear results from engagement of the first brake (03) and the first clutch (15).

6. The multi-speed transmission of claim 1, wherein at least one one-way clutch is located within the transmission.

7. The multi-speed transmission of claim 6, wherein the at least one one-way clutch is located between the input shaft (1), the output shaft (2), the third shaft (3), the fourth shaft (4), the fifth shaft (5), the sixth shaft (6) and the seventh shaft (7) and the housing (G).

8. The multi-speed transmission of claim 1, wherein an input and an output of the transmission are located on a common side of the housing (G).

9. The multi-speed transmission of claim 1, wherein at least one of an axle differential and a transfer case differential is located on one of the input shaft (1) and the output shaft (2).

10. The multi-speed transmission of claim 1, wherein a coupling element facilitates separation of the input shaft (1) from a drive motor.

11. The multi-speed transmission of claim 10, wherein the coupling element is one of a hydrodynamic converter, a hydraulic clutch, a dry starting clutch, a wet starting clutch, a magnetic powder clutch and a centrifugal clutch.

12. The multi-speed transmission of claim 1, wherein an external driving element is located downstream of the transmission, in a direction of power flow, and the input shaft (1) is firmly connected to a crankshaft of a drive motor.

13. The multi-speed transmission of claim 1, wherein the vehicle is started via one of the at least six shifting elements (03) of the transmission, and the input shaft (1) is permanently connected to a crankshaft of a drive motor.

14. The multi-speed transmission of claim 1, wherein a torsional vibration damper is located between a drive motor and the transmission.

15. The multi-speed transmission of claim 1, wherein a wear-free brake is arranged on at least one of the input shaft (1), the output shaft (2), the third shaft (3), the fourth shaft (4), the fifth shaft (5), the sixth shaft (6) and the seventh shaft (7).

16. The multi-speed transmission of claim 1, wherein a power take-off is arranged on at least one of the input shaft (1), the output shaft (2), the third shaft (3), the fourth shaft (4), the fifth shaft (5), the sixth shaft (6) and the seventh shaft (7) for driving an additional unit.

17. The multi-speed transmission of claim 16, wherein the power take-off is arranged on one of the input shaft (1) and the output shaft (2).

18. The multi-speed transmission of claim 1, wherein the at least six shifting elements are one of power-shift clutches and power-shift brakes.

19. The multi-speed transmission of claim 18, wherein the at least six shifting elements are one of multi-disk clutches, band brakes and cone clutches.

20. The multi-speed transmission of claim 1, wherein the at least six elements are one of positive clutches and positive brakes.

21. The multi-speed transmission of claim 1, wherein an electric machine is arranged at least one of the input shaft (1), the output shaft (2), the third shaft (3), the fourth shaft (4), the fifth shaft (5), the sixth shaft (6), and the seventh shaft (7) as one of a generator and an additional drive unit.

* * * * *